United States Patent Office 3,352,872
Patented Nov. 14, 1967

3,352,872
DI-(N-HYDROXYALKYLPIPERIDYL)ALKANES
Francis E. Cislak, Charles K. McGill and George W. Campbell, Jr., Indianapolis, Ind., assignors to Reilly Tar & Chemical Corporation, Indianapolis, Ind., a corporation of Indiana
No Drawing. Filed Apr. 19, 1965, Ser. No. 449,311
6 Claims. (Cl. 260—294.7)

This invention relates to new compositions of matter. More particularly, it relates to new organic compounds, di-(N-hydroxyalkylpiperidyl)alkanes, which compounds have the general formula:

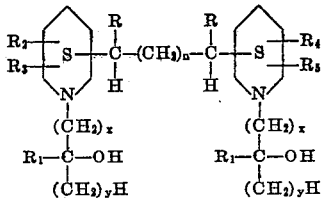

wherein R, $R_1$, $R_2$, $R_3$, $R_4$, and $R_5$ represent hydrogen or lower alkyl, they may be alike or they may be different; $x$ is 0, 1, 2, 3, or 4; $y$ is 0, 1, or 2; $n$ is 0, 1, 2, 3, or 4.

In general, our new compounds may be prepared by the reaction of a chlorohydrin with a di-piperidyl alkane. Or they may be prepared by the reaction of a chlorohydrin with a di-pyridyl alkane and then catalytically hydrogenating the resulting di-quaternary pyridinium salt. Some of them may be prepared by reacting an alkylene oxide with a di-piperidyl alkane.

The di-(N-hydroxyalkylpiperidyl)alkanes of our invention are di-functional alcohols. They have the chemical properties associated with alcohols and are capable of entering into the same type of reactions as other di-functional alcohols, within the limits imposed by the piperidine nucleus. They possess a very low volatility and are soluble in aromatic hydrocarbons and somewhat soluble in water.

Some of our di-(N-hydroxyalkylpiperidyl)alkanes are primary alcohols. They are also tertiary amines. These tertiary amines, with their two primary alcohol groups, can function as a catalyst and chain extender in polyurethane foams.

The di-(N-hydroxyalkylpiperidyl)alkanes of our invention are useful in the manufacture of plasticizers. Reaction with aliphatic carboxylic acids or anhydrides gives esters which are useful plasticizers. The esters of butyric or acetic acid are particularly useful as plasticizers in onjunction with polyesters used in the manufacture of fiber glass; the tertiary nitrogen provides a means of anchoring the polyester to the acidic glass fibers.

When heated with higher molecular weight fatty acids—such as, stearic, lauric, oleic—the di-(N-hydroxyalkylpiperidyl)alkanes form esters that are water insoluble. These esters are useful in cationic flotation processes. They are also useful as rust preventive coatings.

Our di-(N-hydroxyalkylpiperidyl)alkanes are useful in inhibiting the action of non-oxidizing mineral acids upon steel. Thus, 5% of our di-(N-hydroxyalkylpiperidyl) alkanes dispersed in heavy coal tar bases is effective as an inhibitor in the pickling of steel with sulfuric acid and in acidizing oil wells with hydrochloric acid.

With polycarboxylic acids, such for example as adipic, terephthalic, phthalic, sebacic, and the like, our di-(N-hydroxyalkylpiperidyl)alkanes form polyesters. These polyesters are characterized by the presence of a tertiary nitrogen in their molecular make-up which makes them readily dyeable by acid dyes; it also improves the adhesion of rubber to fibers made from them.

The manner of carrying out our invention is described in the following specific examples. These examples are given by way of illustration only and are not intended as a limitation of our invention.

EXAMPLE 1

*1,3-di-4-(N-beta-hydroxyethylpiperidyl)propane*

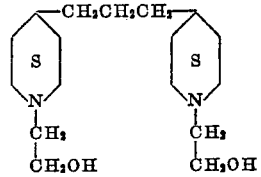

A solution of 210 grams of 1,3-di-(4-piperidyl)propane in 500 cc. of methanol is placed into a two liter flask equipped with a stirrer and an inlet tube which extends below the surface of the solution. While stirring the solution, 88 grams of ethylene oxide is gradually added to the solution over a period of two to three hours in the form of a vapor obtained by warming the liquid ethylene oxide by means of a water bath. The temperature of the reaction mixture is maintained at about 25° C. The reaction may be conducted even at a lower temperature, such as 0° C., but the reaction proceeds satisfactorily and at a faster rate at temperatures in the range of 25–30° C. The reaction is exothermic and some cooling is necessary to prevent the temperature from rising. After all of the ethylene oxide has been added, the solution is stirred for about four hours more. Then the methanol is removed by distillation. The residue is 1,3-di-4-(N-beta-hydroxyethylpiperidyl)propane. For most purposes, the semi-pure product thus obtained is satisfactory. If a purer product is desired, the semi-pure material is distilled under vacuum.

The 1,3 - di - 4 - (N - beta - hydroxyethylpiperidyl) propane boils at about 219° C. at 1 mm. Hg. It has a melting point above about 95° C. It is soluble in benzene. It is only partially soluble in water; it may be recrystallized from water, being recovered in the form of a hydrate; the hydrate readily loses water upon drying in a warm oven.

Instead of carrying out our reaction in methanol, we can do so in other solvents, such for example as water. If we use water, we shall require more of it than of methanol. Thus, instead of the 500 cc. of methanol, we would use about two liters of water.

EXAMPLE 2

*1-3-(N-beta-hydroxyethylpiperidyl)-3-4-(N-beta-hydroxyethylpiperidyl)propane*

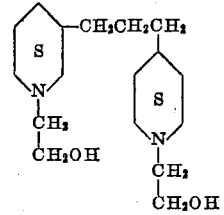

The procedure of Example 1 is repeated with the exception that 1-(3-piperidyl),3-(4-piperidyl)propane is used in place of the 1,3-di-(4-piperidyl)propane.

EXAMPLE 3

*1,3-di-2-(N-beta-hydroxyethylpiperidyl)propane*

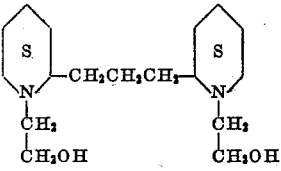

The procedure of Example 1 is repeated with the exception that 1,3-di-(2-piperidyl)propane is used in place of the 1,3-di-(4-piperidyl)propane.

EXAMPLE 4

*1-2-(N-beta-hydroxyethylpiperidyl),3-4-(N-beta-hydroxyethylpiperidyl)propane*

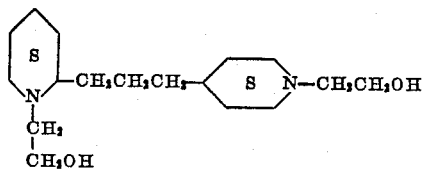

The procedure of Example 1 is repeated with the exception that 1-(2-piperidyl),3-(4-piperidyl)propane is used in place of the 1,3-di-(4-piperidyl)propane.

EXAMPLE 5

*1,3-di-4(delta-hydroxybutylpiperidyl)propane*

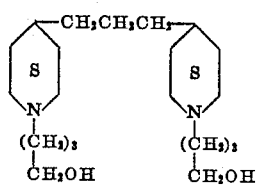

A mixture of 210 grams of 1,3-di-(4-piperidyl)propane and 2,000 grams of water is placed into a three-necked flask equipped with a stirrer, a dropping funnel, and a condenser. To this mixture there is added 100 grams of caustic soda. While stirring the mixture, it is heated to about 70° C. and 216 grams of 4-chloro-n-butanol is gradually added over a period of about one hour. When all of the 4-chloro-n-butanol has been added, the solution is heated under reflux conditions for about four hours. The solution is then cooled and the 1,3-di-4-(delta-hydroxybutylpiperidyl)propane formed during the reaction period is isolated in any convenient manner.

EXAMPLE 6

*1,3-di-4-(N-beta-hydroxypropylpiperidyl)propane*

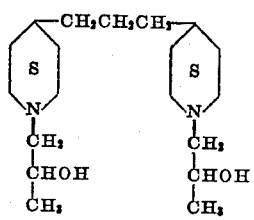

The procedure of Example 1 is repeated with the exception that 116 grams of propylene oxide is used in place of the 88 grams of ethylene oxide.

EXAMPLE 7

*1-2-(N-beta-hydroxyethyl-5-ethylpiperidyl)-3-4-(N-beta-hydroxyethylpiperidyl)propane*

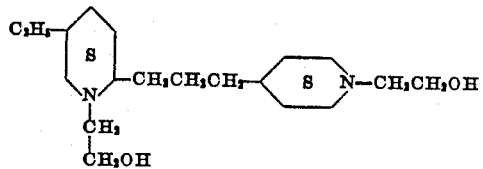

The procedure of Example 1 is repeated with the exception that 238 grams of 1-2-(5-ethylpiperidyl),3-4-piperidylpropane is used in place of the 1,3-di-(4-piperidyl)propane.

EXAMPLE 8

*1,5-di-4-(N-beta-hydroxyethylpiperidyl)pentane*

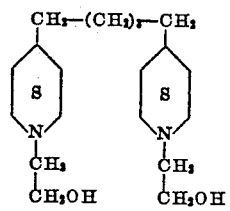

The procedure of Example 1 is repeated with the exception that 252 grams of 1,5-di-(4-piperidyl)pentane is used in place of the 1,3-di-(4-piperidyl)propane.

EXAMPLE 9

*1-[N-beta-hydroxyethyl-4(2,6-dimethylpiperidyl)],3-4-(N-beta-hydroxyethylpiperidyl)propane*

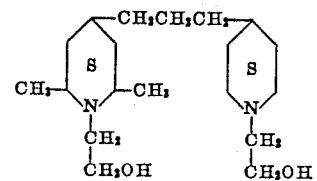

The procedure of Example 1 is repeated with the exception that 238 grams of 1-,4-(2,6-dimethylpiperidyl),3-(4-piperidyl)propane is used in place of the 1,3-di-(4-piperidyl)propane.

EXAMPLE 10

*3,5-di-4-(N-beta-hydroxyethylpiperidyl)pentane*

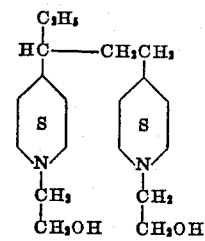

The procedure of Example 1 is repeated with the exception that 238 grams of 3,5-di-(4-piperidyl)pentane is used in place of the 1,3-di-(4-piperidyl)propane.

EXAMPLE 11

*1,4-di-4-(N-beta-hydroxyethylpiperidyl)butane*

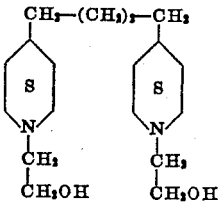

The procedure of Example 1 is repeated with the exception that 238 grams of 1,4-di-(4-piperidyl)butane is used in place of the 1,3-di-(4-piperidyl)propane.

We claim as our invention:
1. Di-(N-hydroxyalkylpiperidyl)alkanes whose formula is:

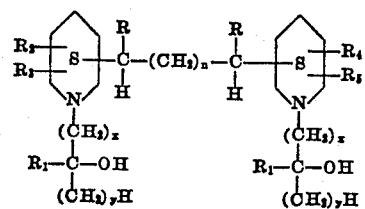

wherein R, $R_1$, $R_2$, $R_3$, $R_4$, and $R_5$ are selected from the class consisting of hydrogen and lower alkyl; $x$ is a member of the group consisting of 0, 1, 2, 3, and 4; $y$ is selected from the group consisting of 0, 1, and 2; $n$ is selected from the class consisting of 0, 1, 2, 3, and 4.

2. 1,3-di-4-(N-beta-hydroxyethylpiperidyl)propane.
3. 1,3-di-4-(N-beta-hydroxypropylpiperidyl)propane.
4. 1,3-di-2-(N-beta-hydroxyethylpiperidyl)propane.
5. 1 - 2 - (N - beta - hydroxyethylpiperidyl), 3 - 4-(N-beta-hydroxyethylpiperidyl)propane.
6. 1,4-di-4-(N-beta-hydroxyethylpiperidyl)butane.

References Cited

UNITED STATES PATENTS

| | | | |
|---|---|---|---|
| 2,624,736 | 1/1953 | Goldberg | 260—293 |
| 2,666,783 | 1/1954 | Lytton | 260—294.7 |
| 2,911,408 | 11/1959 | Biel | 260—294.7 |
| 2,972,617 | 2/1961 | Cislak | 260—294.7 |
| 3,177,254 | 4/1965 | Rogier et al. | 260—294.7 |

WALTER A. MODANCE, *Primary Examiner.*

AVROM D. SPEVACK, *Assistant Examiner.*